(12) United States Patent
Fukawatase et al.

(10) Patent No.: US 7,571,929 B2
(45) Date of Patent: Aug. 11, 2009

(54) KNEE AIRBAG DEVICE

(75) Inventors: Osamu Fukawatase, Nishikamo-gun (JP); Tomoyuki Moro, Toyota (JP); Kenji Imamura, Kosai (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 151 days.

(21) Appl. No.: 11/979,329

(22) Filed: Nov. 1, 2007

(65) Prior Publication Data

US 2008/0106079 A1  May 8, 2008

(30) Foreign Application Priority Data

Nov. 2, 2006   (JP) .............................. 2006-299249

(51) Int. Cl.
*B60R 21/203* (2006.01)
(52) U.S. Cl. .................................. 280/730.1; 280/731
(58) Field of Classification Search ............. 280/730.1, 280/731, 743.1, 743.2, 750, 751, 752
See application file for complete search history.

(56) References Cited

U.S. PATENT DOCUMENTS

| | | | | |
|---|---|---|---|---|
| 3,784,223 | A * | 1/1974 | Hass et al. ................ | 280/730.1 |
| 5,570,901 | A | 11/1996 | Fyrainer | |
| 6,715,789 | B2 * | 4/2004 | Takimoto et al. ......... | 280/730.1 |
| 6,942,245 | B2 * | 9/2005 | Takimoto et al. ......... | 280/730.1 |
| 6,945,557 | B2 * | 9/2005 | Takimoto et al. ......... | 280/730.1 |
| 7,226,075 | B2 * | 6/2007 | Nagata et al. ............. | 280/731 |
| 7,377,541 | B2 * | 5/2008 | Abe et al. ................. | 280/730.1 |
| 2004/0262896 | A1 * | 12/2004 | Mizuno et al. ............ | 280/730.1 |
| 2007/0182134 | A1 * | 8/2007 | Mizuno et al. ............ | 280/730.1 |
| 2008/0100042 | A1 * | 5/2008 | Adachi et al. ............. | 280/730.1 |
| 2008/0106078 | A1 * | 5/2008 | Fukawatase et al. ..... | 280/730.1 |
| 2008/0106080 | A1 * | 5/2008 | Fukawatase et al. ..... | 280/730.1 |
| 2008/0111353 | A1 * | 5/2008 | Fukawatase et al. ..... | 280/730.1 |
| 2008/0116669 | A1 * | 5/2008 | Adachi et al. ............. | 280/730.1 |
| 2008/0122204 | A1 * | 5/2008 | Fukawatase et al. ..... | 280/728.3 |
| 2008/0174091 | A1 * | 7/2008 | Hoshino et al. .......... | 280/728.3 |
| 2008/0211212 | A1 * | 9/2008 | Adachi et al. ............. | 280/731 |
| 2008/0217888 | A1 * | 9/2008 | Fukawatase et al. ..... | 280/730.1 |
| 2008/0217890 | A1 * | 9/2008 | Fukawatase et al. ..... | 280/731 |

FOREIGN PATENT DOCUMENTS

| | | |
|---|---|---|
| JP | A 8-301054 | 11/1996 |
| JP | A 9-104317 | 4/1997 |
| JP | A 9-123862 | 5/1997 |
| JP | A 9-123863 | 5/1997 |
| JP | A 10-71911 | 3/1998 |

(Continued)

*Primary Examiner*—Paul N Dickson
*Assistant Examiner*—Laura Freedman
(74) *Attorney, Agent, or Firm*—Oliff & Berridge, PLC

(57) ABSTRACT

A knee airbag device includes a knee airbag that is disposed in a folded state inside a steering column cover. When the knee airbag receives gas, the knee airbag is inflated and deployed from an inside of the steering column cover toward a knee portion of an occupant. The knee airbag includes an interference suppression member that suppresses interference between the knee airbag and a projection body inside the steering column cover, which projects downward toward at least one side in a vehicle-width direction, when the knee airbag is inflated and deployed.

3 Claims, 3 Drawing Sheets

FOREIGN PATENT DOCUMENTS

| | | |
|---|---|---|
| JP | B2 2759065 | 3/1998 |
| JP | A 2001-106013 | 4/2001 |
| JP | A 2002-37003 | 2/2002 |
| JP | A-2002-46562 | 2/2002 |
| JP | A-2005-75142 | 3/2005 |
| JP | A-2005-193819 | 7/2005 |
| JP | A-2005-289257 | 10/2005 |
| JP | A-2005-335593 | 12/2005 |
| JP | B2 3752920 | 12/2005 |
| JP | B2 3760424 | 1/2006 |
| WO | WO 02/04261 A1 | 1/2002 |

* cited by examiner

KNEE AIRBAG DEVICE

The disclosure of Japanese Patent Application No. 2006-299249 filed on Nov. 2, 2006 including the specification, drawings and abstract is incorporated herein by reference in its entirety.

BACKGROUND OF THE INVENTION

1. Field of the Invention

The invention relates to a knee airbag device.

2. Description of the Related Art

Japanese Patent Application Publication No. 9-104317 (JP-A-9-104317), JP-A-9-123862 and JP-2002-37003 describe a knee airbag device that includes a knee airbag module disposed in a steering column cover that covers a steering column.

However, in the steering column cover, a key cylinder or the like may be provided in an inclined state, and may project downward. In the above-described conventional example, no consideration is given to the interference between the projection body and the knee airbag.

SUMMARY OF THE INVENTION

The invention suppresses inclination of a knee airbag in a knee airbag device due to a projection body in a steering column cover when the knee airbag is deployed.

A first aspect of the invention relates to a knee airbag device that includes a knee airbag that is disposed in a folded state inside a steering column cover. When the knee airbag receives gas, the knee airbag is inflated and deployed from the inside of the steering column cover toward the knee portion of an occupant. The knee airbag includes an interference suppression member that suppresses interference between the knee airbag and a projection body inside the steering column cover, which projects downward toward at least one side in a vehicle-width direction, when the knee airbag is inflated and deployed.

In the knee airbag device according to the above-described aspect, the knee airbag includes the interference suppression member that suppresses interference between the knee airbag and the projection body inside the steering column cover, which projects downward toward at least one side in a vehicle-width direction, when the knee airbag is inflated and deployed. Therefore, when the knee airbag is inflated and deployed, the interference between the knee airbag and the projection body in the steering column cover is suppressed. Thus, it is possible to suppress the inclination of the knee airbag due to the projection body in the steering column cover when the knee airbag is deployed.

In the knee airbag device according to the above-described aspect, the knee airbag may further include an instrument panel-side foundation cloth positioned close to an instrument panel when the knee airbag is deployed, and an occupant-side foundation cloth positioned close to the occupant when the knee airbag is deployed. The interference suppression member may be a strap connected to the instrument panel-side foundation cloth at a first edge of the strap and the occupant-side foundation cloth at a second edge of the strap. The length of the strap in a vehicle-longitudinal direction at a portion that faces the projection body is set to be decreased according to a projection amount of the projection body.

In the above-described aspect, the knee airbag may be deployed such that the occupant-side foundation cloth extends in substantially parallel with the vehicle-width direction. The length of the strap in the vehicle-longitudinal direction at the portion that faces the projection body may be shorter than the length of the strap in the vehicle-longitudinal direction at a portion that does not face the projection body, by an amount corresponding to the projection amount.

In the knee airbag device according to the above-described aspect, the interference suppression member is a strap connected to the instrument panel-side foundation cloth at the first edge of the strap and the occupant-side foundation cloth at the second edge of the strap. The length of the strap in the vehicle-longitudinal direction at the portion that faces the projection body is set to be decreased according to the projection amount of the projection body. Thus, a recessed portion is formed at a portion of the knee airbag when the knee airbag is inflated and deployed. Because the recessed portion faces the projection body in the steering column cover, the interference between the projection body and the knee airbag is suppressed. Thus, using the shape of the strap, the interference between the projection body and the knee airbag is suppressed. With this simple configuration, it is possible to suppress the inclination of the knee airbag when the knee airbag is deployed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
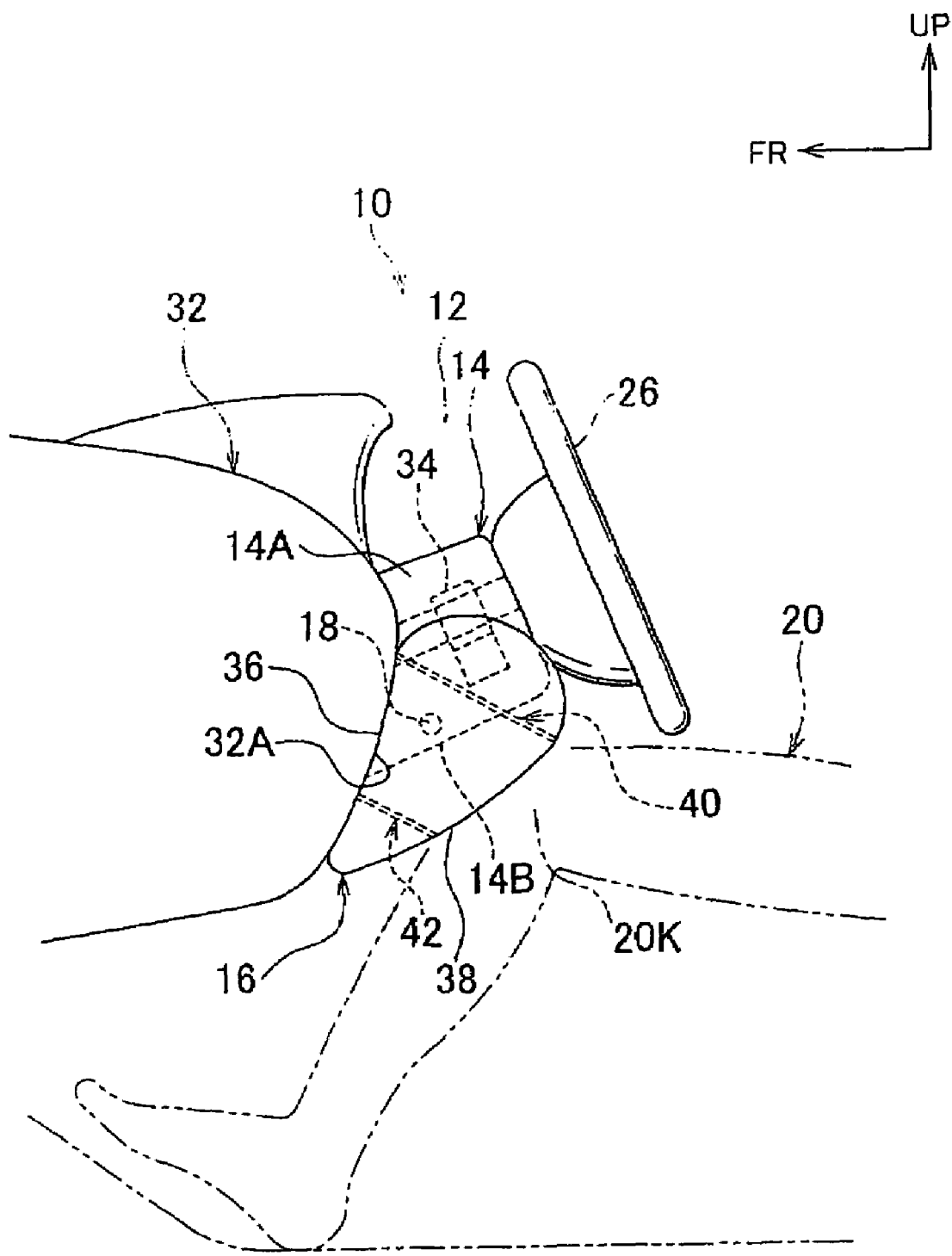
FIG. 1 is a lateral view showing a situation where a knee airbag of a knee airbag device is deployed along the surface of an instrument panel, which is positioned in front of a knee of an occupant, and the knee airbag restrains the knee portion of an occupant.
Figure 2:
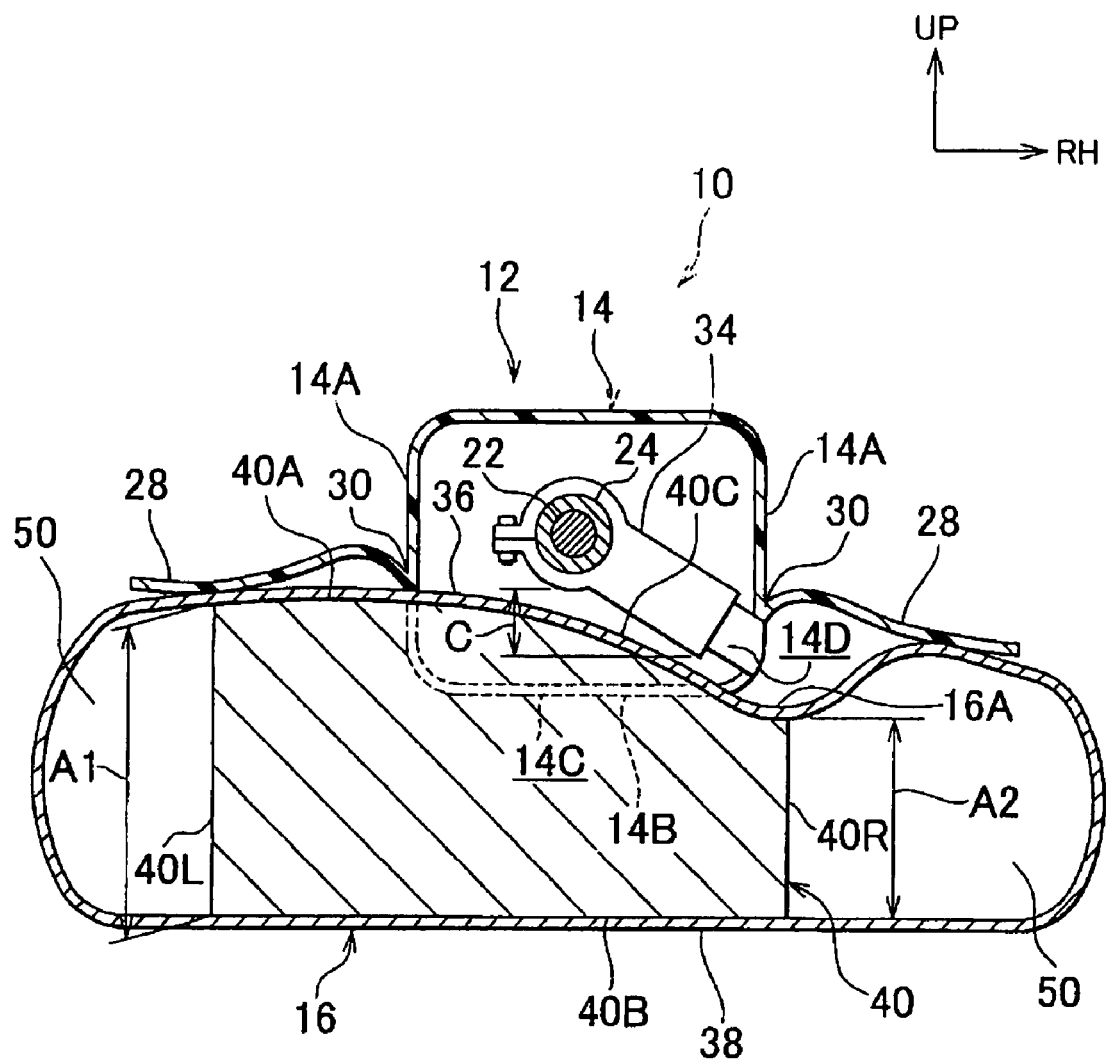
FIG. 2 is an enlarged cross sectional view showing a situation where a strap regulates the shape of the deployed knee airbag, and thus the interference between the knee airbag and a steering lock device in a steering column is suppressed, and the inclination of the knee airbag is suppressed.
Figure 3:
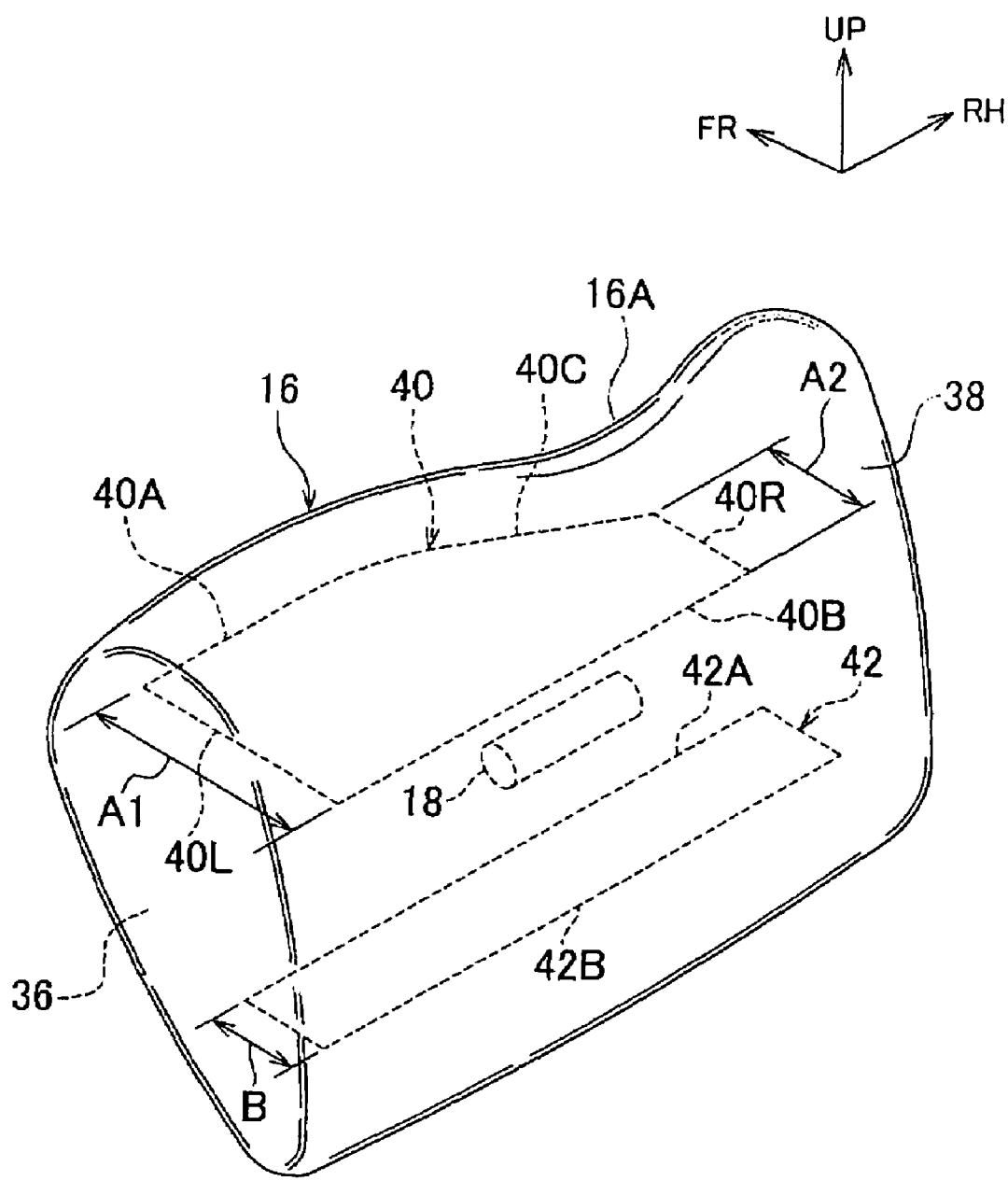
FIG. 3 is an enlarged perspective view showing the deployed knee airbag, which is viewed from the rear of the vehicle.

Hereinafter, an embodiment of the invention will be described with reference to the drawings. In FIG. 1 to FIG. 3, the arrow FR indicates the front of a vehicle and the arrow UP indicates the top of the vehicle. In FIG. 1, a knee airbag device 10 according to the embodiment includes a knee airbag 16. The knee airbag 16 is disposed in a folded state inside a steering column cover 14 that covers a steering column 12. For example, when the knee airbag 16 receives gas supplied from an inflator 18, the knee airbag 16 is inflated and deployed toward the knee portion 20K of an occupant 20 to restrain the knee portion 20K.

In FIG. 2, the steering column 12 includes a steering main shaft 22 and a column tube 24. The steering main shaft 22 is disposed in the core of the steering column 12. The column tube 24, which covers the steering main shaft 22, is supported by a vehicle body. The steering column 12 is inserted through an opening portion (not shown) formed in an instrument panel 32. The steering column 12 protrudes from the instrument panel 32 toward the rear of a vehicle (refer to FIG. 1). The above-described steering column 12 is covered by the steering column cover 14. A steering wheel 26 is attached to the end of the steering main shaft 22, as shown in FIG. 1. The steering wheel 26 is used to steer the vehicle.

As shown in FIG. 1, in the lateral view of the vehicle, the lower surface 14B of the steering column cover 14 extends in substantially parallel with the axis of the steering column 12 (not shown). An airbag module (not shown) is stored inside the steering column cover 14. The airbag module includes the knee airbag 16 in the folded state, and the inflator 18 that supplies the gas to the knee airbag 16 to deploy the knee airbag 16. The inflator 18 is operated by ignition current supplied from an airbag ECU (not shown). When the knee airbag 16, which receives the gas from the inflator 18, is inflated and deployed, an airbag door 28 provided in the steering column cover 14 is opened due to deployment pressure of the knee airbag 16, as shown in FIG. 2. As a result, an opening portion 14C is formed by opening the airbag door 28, and the knee airbag 16 protrudes from the opening portion 14C into a vehicle cabin.

For example, the airbag door 28 includes the lower surface 14B of the steering column cover 14 and portions of the right and left side surfaces 14A of the steering column cover 14. When the knee airbag 16 is deployed, for example, the airbag door 28 is split into right and left portions at the center position of the lower surface 14B in a vehicle-width direction. Certain positions of the right and left side surfaces 14A function as hinges 30, and the right and left portions of the airbag door 28 are opened toward the right and left, respectively. When the airbag door 28 is opened in this manner, the opening portion 14C is formed to extend in the lower surface 14B and portions of the right and left side surfaces 14A of the steering column cover 14.

As shown in FIG. 2, in the steering column cover 14, a steering lock device 34, which is an example of a projection body, is provided. The steering lock device 34 projects downward, for example, toward one side surface of the steering column cover 14 in the vehicle-width direction. For example, the steering lock device 34 is combined with a key cylinder (not shown), and is attached to the column tube 24. Taking into account that a key is inserted into and removed from the key cylinder, the steering lock device 34 extends diagonally downward to the right from the column tube 24. Thus, the steering lock device 34 projects downward toward one side in the vehicle-width direction. The key is inserted into, and removed from the key cylinder through an insertion port 14D formed in the steering column cover 14. When a predetermined key operation is performed, a pin or the like (not shown) is engaged with the steering main shaft 22 to lock the rotational movement of the steering main shaft 22.

In FIG. 1, the knee airbag 16 is formed to have a bag shape, by sewing an instrument panel-side foundation cloth 36 and an occupant-side foundation cloth 38 together. When the knee airbag 16 is deployed, the instrument panel-side foundation cloth 36 is positioned close to the instrument panel 32, and the occupant-side foundation cloth 38 is positioned close to the occupant 20. An upper strap 40 and a lower strap 42 are provided inside the knee airbag 16. The strap 40 is an example of the interference suppression means connected to the instrument panel-side foundation cloth 36 and the occupant-side foundation cloth 38. When the knee airbag 16 is deployed, the strap 40 is positioned in the upper portion of the knee airbag 16 at a position below the steering lock device 34. The strap 42 is positioned in the lower portion of the knee airbag 16, which does not interfere with the steering column cover 14.

In FIG. 2, the length of the strap 40 in a vehicle-longitudinal direction (hereinafter, the length will be simply referred to as "width") is set to be decreased at a portion that faces the steering lock device 34 according to a projection amount C of the steering lock 34. In other words, the width of the strap 40 at the portion that faces the steering lock device 34 is smaller than the width of the strap 40 at a portion that does not face the steering lock device 34 by an amount corresponding to the projection amount C. More specifically, the width from an occupant-side edge 40B to an instrument panel-side edge 40A is a constant width A1, in an area of the strap 40 from a left edge 40L in the vehicle-width direction (hereinafter, referred to as "vehicle-width direction left edge 40L") to a substantially center portion in the vehicle-width direction. A portion of the front edge of the strap 40, which extends from the substantially center portion in the vehicle-width direction to a right edge 40R in the vehicle-width direction (hereinafter, referred to as "vehicle-width direction right edge 40R"), constitutes an inclination portion 40C. The inclination portion 40C is inclined toward the rear of the vehicle in a direction from the substantially center portion to the vehicle-width direction right edge 40R so that the width is gradually decreased. The inclination portion 40C is formed according to the inclination and the projection amount C of the steering lock device 34. The width A2 of the strap 40 at the vehicle-width direction right edge 40R is set to be smaller than the width A1 of the strap 40 at the vehicle-width direction left edge 40L. The width A1 and the width A2 are widths from the occupant-side edge 40B of the strap 40, which extends in parallel with the vehicle-width direction.

In FIG. 3, the instrument panel-side edge 40A and the inclination portion 40C of the strap 40 is sewn to the instrument panel-side foundation cloth 36. The occupant-side edge 40B is sewn to the occupant-side foundation cloth 38. Because the inclination portion 40C of the strap 40 regulates the shape of the deployed knee airbag 16, it is possible to suppress the interference between the deployed knee airbag 16 and the steering lock device 34. The instrument panel-side edge 42A of the strap 42 is sewn to the instrument panel-side foundation cloth 36, and the occupant-side edge 42B of the strap 42 is sewn to the occupant-side foundation cloth 38. Thus, the strap 42 regulates the shape of the lower portion of the deployed knee airbag 16.

As shown in FIG. 1, when the knee airbag 16 is deployed, the strap 42 does not interfere with the steering column cover 14. Therefore, as shown in FIG. 3, for example, the width B of the strap 42 is set to be constant, and smaller than the width A1 of the strap 40. In other words, the width A1 of the strap 40 is set to be larger than the width B of the strap 42 so that portions of the knee airbag 16, which are positioned on the right and left sides of the steering column cover 14, contact the surface 32A of the instrument panel 32, and reaction force is generated at the surface 32A, when the knee airbag 16 restrains the knee portion 20K of the occupant 20. The surface 32A of the instrument panel 32 is positioned in front of the knee of the occupant. The length of the strap 40 in the vehicle-width direction and the length of the strap 42 in the vehicle-width direction are shorter than the length of the knee airbag 16 in the vehicle-width direction.

In FIG. 3, the vehicle-width direction left edge 40L of the strap 40, and the vehicle-width direction right edge 40R of the strap 40, and the right and left edges of the strap 42 in the vehicle-width direction are not sewn to the instrument panel-side foundation cloth 36 nor to the occupant-side foundation cloth 38. When the gas is supplied, for example, into a portion of the knee airbag 16 between the upper and lower straps 40 and 42, the gas flows through spaces 50 beside the vehicle-width direction left edge 40L and the vehicle-width direction right edge 40R of the strap 40 toward the upper portion of the knee airbag 16. In addition, the gas flows through spaces beside the right and left edges of the strap 42 in the vehicle-width direction toward the lower portion of the knee airbag 16.

The shape and size of each of the straps 40 and 42 are not limited to the shape and size shown in FIGS. 1 to 3. Also, one or more straps may be additionally provided inside the knee airbag 16. In FIG. 3, the inflator 18 is disposed at the substantially center portion of the knee airbag 16 to clearly show the inflator 18. However, the inflator 18 is actually positioned inside the steering column cover 14 as shown in FIG. 1.

[Advantageous effects] In the embodiment, the knee airbag device 10 has the above-described configuration. Hereinafter, the advantageous effects of the knee airbag device 10 will be described. In FIG. 1, when the vehicle has a frontal collision, and the airbag ECU (not shown) determines that the vehicle has a frontal collision, the airbag ECU supplies the ignition current to the inflator 18, and the inflator 18 is operated to supply a large amount of gas to the knee airbag 16 in the folded state inside the knee airbag device 10. Then, as shown in FIG. 2, the airbag door 28 of the steering column cover 14 is opened, that is, the right and left portions of the airbag door 28 pivot around the hinges 30 provided in the side surfaces 14A of the steering column cover 14 toward the right and left, respectively, due to the deployment pressure of the knee airbag 16. As a result, the opening portion 14C is formed to extend in a large area, i.e., in the lower surface 14B and portions of the right and left side surfaces 14A of the steering column cover 14. Thus, the knee airbag 16 is inflated and deployed from the opening portion 14C toward the vehicle cabin so that the knee airbag 16 restrains the knee portion 20K of the occupant 20 (refer to FIG. 1).

As shown in FIG. 3, in the process in which the knee airbag 16 is inflated and deployed, the gas is supplied from the inflator 18, for example, into a portion between the upper strap 40 and the lower strap 42. The gas flows through the spaces beside the vehicle-width direction left edge 40L and the vehicle-width direction right edge 40R of the strap 40 toward the upper portion of the knee airbag 16. In addition, the gas flows through the spaces beside the right and left edges of the strap 42 in the vehicle-width direction toward the lower portion of the knee airbag 16. Thus, the both end portions of the knee airbag 16 in the vehicle-width direction, which are positioned in front of the knee portion 20K of the occupant 20 (FIG. 1), are quickly deployed. This improves the performance of restraining the knee portion 20K.

As shown in FIG. 2, the steering lock device 32 in an area surrounded by the knee airbag 16 and the steering column cover 14 projects diagonally downward to the right. However, in the knee airbag device 10, because the strap 40 regulates the shape of the deployed knee airbag 16, it is possible to suppress the interference between the knee airbag 16 and the steering lock device 34 when the knee airbag 16 is inflated and deployed.

More specifically, in the strap 40, the width A2 of the strap 40 at the vehicle-width direction right edge 40R that faces the steering lock device 34 is set to be smaller than the width A1 of the strap 40 at the vehicle-width direction left edge 40L, by an amount corresponding to the projection amount C. In addition, the inclination portion 40C, which faces the steering lock device 34, is provided. Therefore, the inclination portion 40C regulates the shape of the deployed knee airbag 16, and thus, a recessed portion 16A that faces the steering lock device 34 is formed in the knee airbag 16 when the knee airbag 16 is inflated and deployed. Because the steering lock device 34 projects into an area surrounded by the recessed portion 16A and the steering column cover 14, it is possible to suppress the interference between the steering lock device 34 and the knee airbag 16.

Thus, in the knee airbag device 10, using the shape of the strap 40, the interference between the steering lock device 34 and the knee airbag 16 is suppressed. With this simple configuration, it is possible to suppress the inclination of the knee airbag 16 due to the steering lock device 34 in the steering column cover 14 when the knee airbag 16 is deployed. In addition, in the knee airbag device 10, as shown in FIG. 3, the straps 40 and 42 connect the instrument panel-side foundation cloth 36 and the occupant-side foundation cloth 38 of the knee airbag 16, and the width A1 of the strap 40, which is disposed at the upper position when the knee airbag 16 is deployed, is set to be larger than the width B of the strap 42, which is disposed at the lower position when the knee airbag 16 is deployed. Therefore, as shown in FIG. 1, when the knee airbag 16 restrains the knee portion 20K of the occupant 20, the knee airbag 16 is deployed such that the upper portion of the knee airbag 16 extends along the surface 32A of the instrument panel 32. Thus, the reaction force used to restrain the knee portion 20K of the occupant 20 is quickly generated at the surface 32A of the instrument panel 32. This improves the performance of restraining the knee portion 20K of the occupant 20.

In the above-described embodiment, the strap 40 is employed as an example of the interference suppression means. However, the interference suppression means is not limited to the strap 40. Any means may be employed as long as the means suppresses the interference between the knee airbag 16 and the steering lock device 34, and suppresses the inclination of the knee airbag 16 due to the steering lock device 34. Also, the steering lock device 34 is employed as an example of the projection body. However, the projection body is not limited to the steering lock device 34. Various components or portions, which project downward toward at least one side in the vehicle-width direction, may be regarded as the projection body. In FIG. 2, the strap 40 is hatched to clearly show the position of the strap 40 in the knee airbag 16. The hatched portion does not represent a cross section.

What is claimed is:

1. A knee airbag device comprising:
a knee airbag that is disposed in a folded state inside a steering column cover, wherein:
when the knee airbag receives gas, the knee airbag is inflated and deployed from an inside of the steering column cover toward a knee portion of an occupant;
the knee airbag includes a recessed portion that suppresses interference between the knee airbag and a steering lock device inside the steering column cover, which projects downward toward a right side of a vehicle from a column tube of a steering column, when the knee airbag is inflated and deployed; and
inclination of the knee airbag due to the steering lock device is suppressed when the knee airbag is inflated and deployed.

2. The knee airbag device according to claim 1, wherein:
the knee airbag further includes an instrument panel-side foundation cloth positioned close to an instrument panel when the knee airbag is deployed, and an occupant-side foundation cloth positioned close to the occupant when the knee airbag is deployed;
the recessed portion of the knee airbag is formed by a strap that is provided in the knee airbag, and that is connected to the instrument panel-side foundation cloth and the occupant-side foundation cloth; and a length of the strap from the occupant-side foundation cloth in a vehicle-longitudinal direction at a portion that faces the steering lock device is set to be decreased according to a projection amount of the steering lock device.

3. The knee airbag device according to claim 2, wherein:

the strap is an upper strap that is positioned in an upper portion of the knee airbag at a position below the steering lock device when the knee airbag is deployed;

a lower strap is further provided in the knee airbag, and the lower strap is positioned in a lower portion of the knee airbag, which does not interfere with the steering column cover, when the knee airbag is deployed;

a portion of a front edge of the upper strap, which extends from a center portion in a vehicle-width direction to a right edge in the vehicle-width direction, constitutes an inclination portion, and the inclination portion is inclined toward a rear of the vehicle in a direction from the center portion to the right edge in the vehicle-width direction; and a length of the inclination portion in the vehicle-longitudinal direction at the right edge in the vehicle-width direcation is set to be shorter than a length of the upper strap in the vehicle-longitudinal direction at a left edge in the vehicle-width direction.

* * * * *